United States Patent [19]

Stewart

[11] 4,209,555

[45] Jun. 24, 1980

[54] CORROSION RESISTANT GALVANIC COATING

[75] Inventor: Joe W. Stewart, Milwaukee, Wis.

[73] Assignee: A. O. Smith Corporation, Milwaukee, Wis.

[21] Appl. No.: 6,745

[22] Filed: Jan. 26, 1979

[51] Int. Cl.$^2$ .............................................. C09D 5/10
[52] U.S. Cl. .................................. 427/292; 106/1.17; 204/148; 427/427; 428/450; 427/397.8
[58] Field of Search ............... 106/1.17; 252/512, 513; 427/344, 372 B, 292, 427; 204/148; 428/450

[56] References Cited

U.S. PATENT DOCUMENTS

| | | | |
|---|---|---|---|
| 3,056,684 | 10/1962 | Lopata et al. | 106/1.17 |
| 3,372,038 | 3/1968 | Weldes et al. | 106/1.17 |
| 3,392,036 | 7/1968 | McLeod | 106/1.17 |
| 3,423,229 | 1/1969 | Kompanck et al. | 427/344 |
| 3,653,930 | 4/1972 | Law et al. | 106/1.17 |
| 3,660,119 | 5/1972 | Oken | 106/1.17 |
| 3,730,743 | 5/1973 | McLeod | 106/1.17 |
| 3,778,280 | 12/1973 | Dittrich | 106/1.17 |
| 3,997,501 | 12/1976 | McLeod | 106/1.17 |
| 4,014,703 | 3/1977 | Hayati et al. | 106/1.17 |

*Primary Examiner*—Ralph S. Kendall
*Attorney, Agent, or Firm*—Andrus, Sceales, Starke & Sawall

[57] ABSTRACT

A coating of the inorganic zinc type which has, among other uses, excellent performance in the cathodic protection of metal from corrosion, especially when exposed to hot water. The coating is composed of mixture of zinc dust, extremely fine, high purity aluminum, sodium aluminum silicate and red iron oxide or titanium dioxide. Clay may be added for flow control and/or thixotrophy. The powder mixture is mixed with an alcoholic solution of partially hydrolyzed ethyl silicate liquid to form a slurry, and the slurry is thereafter sprayed or otherwise applied to a metal substrate to provide a coating having a thickness of 2 to 10 mils. Drying of the coating acts to evaporate the alcohol, and exposure to atmospheric humidity will fully hydrolyze the ethyl silicate to produce a dense, hard, tightly adherent coating which provides excellent corrosion resistance in a hot water environment.

12 Claims, No Drawings

CORROSION RESISTANT GALVANIC COATING

BACKGROUND OF THE INVENTION

It is well recognized that ferrous metals can be cathodically protected against corrosion by being placed in an electrical circuit with metals which are above iron in the electromotive series, such as magnesium, zinc and aluminum. When two different metals are present in a corrosive environment, the oxidation of the metal which is highest in the electromotive series will occur.

To provide this type of cathodic protection, efforts have been made in the past to develop coatings for ferrous metals containing metal powder, such as zinc or aluminum. A difficulty lies in developing an appropriate vehicle or binder in which the metallic powder can be incorporated. The coating must be hard and abrasion resistant, and at the same time, adherent to the metallic surface so as to establish a permanent protective film which will not flake away or craze. In the past, various types of galvanic coatings have been proposed in which metallic powder, such as zinc, has been incorporated with a bonding agent, such as an alkyl silicate, and particularly ethyl silicate. However, these prior coatings have given extremely poor performance with respect to corrosion protection in a hot water environment of approximately 180° F. to 212° F., as encountered in a domestic hot water heater. At these high temperatures, the zinc particles not only oxidize and form carbonates, but the zinc particles will tend to polarize and lose their galvanic properties.

SUMMARY OF THE INVENTION

The present invention is directed to a coating for metal surfaces exposed to a corrosive medium, such as hot water, and is composed of zinc dust, aluminum powder, sodium aluminum silicate, iron oxide, or titanium dioxide ore, and a thixotrope, such as clay. The powder blend is then mixed with an alcoholic solution of partially hydrolyzed ethyl silicate to form a slurry. The slurry is then sprayed or otherwise applied to a metal substrate that has preferably been prepared by grit or sand blasting. 2 to 10 mils of coating may be applied as a single coat and dried. The drying may be accelerated by the use of slightly elevated temperatures up to 250° F.

Drying serves to evaporate the alcohol carrier, and subsequent exposure to ambient moisture will act to fully hydrolyze the ethyl silicate binder to produce a hard, tightly adherent coating.

DESCRIPTION OF THE PREFERRED EMBODIMENT

The invention is directed to an improved corrosion resistant, galvanic coating for a metal substrate, having particular use as an internal coating for water heaters in which water is stored at temperatures of from 180° F. to 212° F.

The metal substrate to be protected will normally be carbon steel, although the coating can be used to protect other metals which are exposed to a corrosive atmosphere.

In general, the coating comprises a blend of powdered or finely divided materials which are mixed with a liquid, partially hydrolyzed ethyl silicate, to form a slurry which is applied to the metal surface to be protected. The blend of finely divided materials is composed of zinc dust, high purity aluminum powder, sodium aluminum silicate and iron oxide or titanium dioxide ore. Clays, such as bentonite or dry colloidal silica may be added for flow control and/or thixotrophy.

All of the dry ingredients are chosen on the basis of their suitability for use in potable water systems. Variations in purity of the zinc dust, high purity aluminum powder, iron oxide, or titanium dioxide ore and silicate, change the potable water acceptability for using the coating in hot water heaters under the Environmental Protection Agency Drinking Water regulations 40 CFR 141; 40 FR 59565, Dec. 24, 1975, amend by FR28402, July 9, 1976.

The blend of finely divided materials which will give satisfactory service falls within the parameters of the following formulations by weight:

| | |
|---|---|
| Zinc dust | 50–400 parts |
| High Purity Aluminum Powder | 50–200 parts |
| Sodium Aluminum Silicate | 50–150 parts |
| Iron Oxide (Red) | 1–10 parts |
| Thixotropic Material | 1–5 parts |

The coating of the invention has excellent performance in hot water with little or no oxide or carbonate formation and the zinc will not polarize in the hot water environment with the passage of time. The prevention of polarization of the zinc is believed to be accomplished through use of the aluminum powder. The aluminum will oxidize at a faster rate than the zinc, thus acting as a scavenger to protect the zinc from oxidation.

In the coating, the sodium aluminum silicate functions as a filler to reduce the amount of zinc and aluminum required.

It has also been found that finely divided titanium dioxide ore ($TiO_2$ ore) can be substituted for the red iron oxide. When titanium dioxide ore is used a suitable formulation is:

| | |
|---|---|
| Zinc dust | 50–400 parts |
| Aluminum Powder | 50–400 parts |
| Sodium Aluminum Silicate | 50–150 parts |
| Titanium Dioxide Ore ($TiO_2$ Ore) | 20–110 parts |
| Thixitrope | 1– 5 parts |

The $TiO_2$ ore has a considerable amount of iron oxide and is an extremely hard material which gives a hardness to the final coating material required in certain applications.

After mixing the above finely divided ingredients to form a powdered mixture, from 2.9 to 4.0 parts of the powder are then mixed with 0.9 to 1.5 parts of a liquid, evaporable, non-aqueous carrier, such as ethyl alcohol, containing partially hydrolyzed ethyl silicate, to form a slurry. Thereafter the resulting slurry is sprayed or otherwise applied to the metal substrate which is preferably cleaned or prepared by grit or sand blasting. While pickling can be utilized to prepare the metal substrate, grit or sand blasting is preferred in order to provide a roughened surface which will increase the adherance of the coating. The best results have been obtained by applying the coating in a thickness of 2 to 10 mils as a single coat. The coating may be dried in air, or the drying may be accelerated by the use of slightly elevated temperatures, up to approximately 250° F. The drying evaporates the solvent or carrier, and subsequent exposure to ambient moisture will complete the hydrolysis reaction to provide the hard, adherent coating.

The ethyl silicate after curing forms an inorganic polymer binder having $SiO_2$ linkages.

The ethyl silicate is preferably used in the form of an alcohol solution, containing approximately 66% ethyl alcohol, such as that available from Stauffer Chemical Co. under the trademark "Silbond H-6" and is about 70% to 90% hydrolyzed.

The following examples illustrate the preparation and use of the corrosion resistant coating of the invention.

EXAMPLE I

The following formulation was prepared by weight as follows:

| | |
|---|---|
| Zind Dust | 200 parts |
| High Purity Aluminum Powder | 100 parts |
| Sodium Aluminum Silicate | 100 parts |
| Iron Oxide (Red) | 5 parts |
| Bentonite | 5 parts |

These materials were mixed together into a powder form in a tumbling machine. Thereafter, 3.2 parts of the powder was mixed in a high shear mixing machine with 1 part of Silbond H-6 ethyl silicate, to wet all the dry materials. The mixing was continued until all the dry particles were dispersed throughout the coating composition. This composition was then sprayed onto a grit blasted interior surface of a carbon steel water heater tank substrate at a viscosity of 32 to 34 seconds using a General Electric Zahn No. 2 cup. The coating had a thickness ranging from 6 to 10 mils and was dried for seven days at room temperature, allowing the alcohol to evaporate from the coating and further hydrolysis to occur due to the moisture in the air. There was no evidence of the coating sagging on the tank side walls upon drying. The coating was then tested by exposing it to 190° F. water for a period of thirty days and after this period there was no evidence of blistering or rusting.

EXAMPLE II

The following formulation was prepared by weight as follows:

| | |
|---|---|
| Zinc Dust | 200 parts |
| High Purity Aluminum Powder | 100 parts |
| Sodium Aluminum Silicate | 100 parts |
| Titanium Dioxide Ore | 40 parts |
| Dry Colloidal Silica | 4 parts |

The titanium dioxide ore was initially ball milled. Thereafter, the zinc dust, aluminum powder, sodium aluminum silicate and the dry colloidal silica were added to the mill and the entire mixture was ball milled into a generally powder-like consistency. 3.2 parts of the powder were then mixed with 1 part of partially hydrolyzed ethyl silicate (Silbond H-6) in a high shear mixing machine to wet all the dry ingredients. The mixing, as in the Example I, was continued until all the dry particles were dispersed throughout the coating composition. The composition was then sprayed onto a grit blast carbon steel test panel, at a viscosity of 30 to 34 seconds using a Zahn No. 2 cup and dried for seven days. The resultant coating had a thickness of about 6 to 10 mils. The coating was then tested by exposing it to 190° F. to 212° F. water for thirteen months on two respective test panels. There was no evidence of rusting or blistering of either panel even through a 1/16 inch diameter hole was drilled through the coating into the steel of each panel.

EXAMPLE III

The following formulation was prepared by weight for coating steel such as would be used in automobile frames. Such a coating must pass test requirements of SAE J-400.

| | |
|---|---|
| Zinc Dust | 200 parts |
| High Purity Aluminum Powder | 100 parts |
| Sodium Aluminum Silicate | 100 parts |
| Iron Oxide (red) | 5 parts |
| Bentonite | 3 parts |

The materials were mixed together into a fine powder form in a tumbling machine, as in Example I. Thereafter 3 to 4 parts of the powder were mixed with one part of ethyl silicate (Silbond H-6) to wet the dry powder. The mixing continued until all the dry particles were dispered throughout the coating composition. Panels of the steel used to make automobile frames which had been grit blasted were dipped into the coating slurry to provide a coating thickness of 1 to 4 mils. The viscosity of the slurry was from 30 to 45 seconds. Heat up to 250° F. was applied to evaporate the alcohol in the coating and the panels were then exposed to air for from 4 to 9 days to complete the drying of the coating and fully hydrolyze the coating. Thereafter the panels were tested by exposure to salt fog for the period of time specified in General Motors Materials Standards No. 377900 and SAE specifications J-400. All the panels met the standards without evidence of rusting.

EXAMPLE IV

In this example the formulation for coating automotive frame steel was as follows:

| | |
|---|---|
| Zinc Dust | 200 parts |
| High Purity Aluminum Powder | 100 parts |
| Sodium Aluminum Silicate | 100 parts |
| Titanium Dioxide Ore | 40 parts |
| Dry Colloidal Silica | 4 parts |

The titanium dioxide ore was initially ball milled. Thereafter the zinc dust, aluminum powder, sodium aluminum silicate and dry colloidal silica were added to the mill and the entire mixture was ball milled into a generally powder-like consistency. The procedure thereafter followed was the same as that set forth in Example III and after the exposure there described, the panels all met the standards and SAE specifications without evidence of rusting beyond the degree specified.

Various modes of carrying out the invention are contemplated as being within the scope of the following claims particularly pointing out and distinctly claiming the subject matter which is regarded as the invention.

I claim:

1. A protective coating composition to be applied to a metal substrate to cathodically protect the substrate when exposed to heated water, consisting essentially of (a) a dry finely divided mixture of 50–400 parts by weight zinc dust, 50–200 parts by weight of high purity aluminum powder, 50–150 parts by weight of sodium aluminum silicate, 1–5 parts by weight of a thixotrope, and a material selected from the group consisting of 1 to 10 parts by weight of iron oxide and 20 to 110 parts by weight titanium dioxide, and (b) a liquid, evaporable, non-aqueous carrier containing partially hydrolyzed ethyl silicate, said ethyl silicate being 70% to 90% hydrolyzed, said coating composition being dried after application to the metal substrate to evaporate the carrier and subsequent exposure to moisture acting to substantially fully hydrolyze the ethyl silicate to produce a hard adherent coating on said substrate.

2. The composition of claim 1, wherein said composition contains 2.9 to 4.0 parts by weight of said mixture (a) to 0.9 to 1.5 parts by weight of said (b).

3. The composition of claim 1, wherein said carrier is ethyl alcohol and the ethyl silicate is dissolved in said alcohol to form a solution.

4. The composition of claim 3, wherein the solution contains approximately 66% by weight of said alcohol.

5. The composition of claim 1, wherein said zinc comprises 200 parts by weight, said aluminum comprises 100 parts by weight, said sodium aluminum silicate comprises 100 parts by weight, said material comprises 5 parts by weight of iron oxide and said thixotrope comprises 1–5 parts by weight of bentonite.

6. A protective coating composition to be applied to a ferrous substrate to cathodically protect the substrate, consisting essentially of (a) a dry finely divided mixture of 50–400 parts by weight zinc dust, 50–200 parts by weight of high purity aluminum powder, 50–150 parts by weight of sodium aluminum silicate, 1–5 parts by weight of a thixotrope, and a material selected from the group consisting of 1 to 10 parts by weight of iron oxide and 20 to 100 parts by weight of titanium dioxide, and (b) an ethyl alcohol solution having dissolved therein partially hydrolyzed ethyl silicate, said ethyl silicate being present in a weight ratio of 0.9 to 1.5 parts of ethyl silicate to 2.9–4.0 parts of said mixture (a), said ethyl silicate being 70% to 90% hydrolyzed.

7. The composition of claim 6, wherein the ethyl silicate is 70% to 90% hydrolyzed.

8. The method of claim 6, wherein said coating has a thickness of 2 to 10 mils.

9. A method of cathodically protecting a metal substrate from corrosion when exposed to heated water; comprising the steps of preparing a finely divided mixture consisting essentially of 50–400 parts by weight of zinc dust, 50–200 parts by weight of high purity aluminum powder, 50–150 parts by weight of sodium aluminum silicate, 1–5 parts by weight of a thixotrope, and a material selected from the group consisting of 1 to 10 parts by weight of iron oxide and 20 to 110 parts by weight of titanium dioxide to form a mixture; admixing a liquid, evaporable, non-aqueous carrier containing partially hydrolyzed ethyl silicate with the mixture to provide a slurry, said ethyl silicate being 70% to 90% hydrolyzed, applying the slurry to a surface of a metal substrate as a coating, drying the coating to evaporate the carrier, substantially fully hydrolyzing the ethyl silicate to provide a hard adherent coating, and thereafter exposing the coating to heated water.

10. The method of claim 9, wherein the carrier is ethyl alcohol and said ethyl silicate is dissolved in said alcohol.

11. The method of claim 9, and including the step of preparing the surface of said substrate prior to applying the slurry thereto by blasting the surface with particulate material to roughen said surface.

12. The method of claim 9, wherein said slurry is sprayed on said surface.

* * * * *

UNITED STATES PATENT AND TRADEMARK OFFICE
CERTIFICATE OF CORRECTION

PATENT NO. : 4,209,555

DATED : June 24, 1980

INVENTOR(S) : JOE W. STEWART

It is certified that error appears in the above-identified patent and that said Letters Patent are hereby corrected as shown below:

Column 5, line 32, After "20 to" cancel "100" and substitute therefor ---110---

Signed and Sealed this

Seventh Day of October 1980

[SEAL]

Attest:

SIDNEY A. DIAMOND

Attesting Officer

Commissioner of Patents and Trademarks